United States Patent
Matsuo et al.

(10) Patent No.: US 9,742,244 B2
(45) Date of Patent: Aug. 22, 2017

(54) DRIVER DEVICE

(71) Applicant: DENSO CORPORATION, Kariya, Aichi-pref. (JP)

(72) Inventors: Yasufumi Matsuo, Nagoya (JP); Masashi Yamasaki, Obu (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 14/553,121

(22) Filed: Nov. 25, 2014

(65) Prior Publication Data
US 2015/0155759 A1     Jun. 4, 2015

(30) Foreign Application Priority Data

Nov. 29, 2013   (JP) .................. 2013-247469

(51) Int. Cl.
| | |
|---|---|
| H02K 1/32 | (2006.01) |
| H02K 9/22 | (2006.01) |
| B62D 5/04 | (2006.01) |
| H02K 11/215 | (2016.01) |
| H02K 11/33 | (2016.01) |

(52) U.S. Cl.
CPC ............ *H02K 9/22* (2013.01); *B62D 5/0406* (2013.01); *H02K 11/215* (2016.01); *H02K 11/33* (2016.01)

(58) Field of Classification Search
CPC .... H02K 11/33; H02K 11/0073; H02K 5/225; H02K 7/116; H02K 9/22; H02K 11/215; H02K 5/10; H02K 7/06; H02K 1/276; H02K 3/50; H02K 7/083; H02K 7/14; H02K 11/225; H02K 1/278; H02K 21/14; H02K 29/08; B01L 2300/1855; B01L 9/06; B01L 9/52; B01L 9/543; B01L 1/00; B01L 2200/10; B01L 3/502; B01L 3/502715; B01L 2200/023; B01L 2200/025; B01L 2200/0673; B01L 2200/0689; B01L 2300/041; B01L 2300/0851; B62D 5/0406

USPC ............................................ 310/64, 68 B, 71
See application file for complete search history.

(56) References Cited

U.S. PATENT DOCUMENTS

| | | | |
|---|---|---|---|
| 5,406,154 A * | 4/1995 | Kawaguchi .............. | B60L 7/10 180/220 |
| 5,552,988 A | 9/1996 | Kawaguchi et al. | |
| 6,860,643 B2 * | 3/2005 | Nakura ................ | G02B 6/4292 385/53 |

(Continued)

OTHER PUBLICATIONS

Hiramine et al., U.S. Appl. No. 14/553,025, filed Nov. 25, 2014.

(Continued)

*Primary Examiner* — Thanh Lam
(74) *Attorney, Agent, or Firm* — Nixon & Vanderhye P.C.

(57) ABSTRACT

In a driver device, a controller substrate has a center part on which a rotation angle sensor is attached and an outer periphery portion which is fixed onto a heat sink. The heat sink has a cylinder part extending in an axial direction of the rotation shaft to contact the outer periphery portion of the controller substrate. The cylinder part of the heat sink is continuously formed along an entire periphery and has the same height at all portions. Such configuration provides an even deformation distribution of the cylinder part due to a temperature change, thereby reducing unevenness of heat stress distribution along a substrate plane and decreasing stress applied to the sensor, which facilitates a reduction of a detection error of the sensor.

8 Claims, 6 Drawing Sheets

(56) References Cited

U.S. PATENT DOCUMENTS

| | | |
|---|---|---|
| 2003/0127920 A1 | 7/2003 | Yamazaki et al. |
| 2011/0254388 A1* | 10/2011 | Yamasaki ............ B62D 5/0406 |
| | | 310/43 |
| 2011/0254393 A1* | 10/2011 | Yamasaki .............. H02K 11/33 |
| | | 310/64 |
| 2011/0285223 A1* | 11/2011 | Miyachi ................ H02K 11/33 |
| | | 310/64 |
| 2012/0161590 A1* | 6/2012 | Yamasaki .............. H02K 5/225 |
| | | 310/68 B |
| 2013/0257232 A1 | 10/2013 | Tomizawa et al. |

OTHER PUBLICATIONS

Hiramine et al., U.S. Appl. No. 14/553,061, filed Nov. 25, 2014.
Miyachi, U.S. Appl. No. 14/553,090, filed Nov. 25, 2014.
Tsuboi, U.S. Appl. No. 14/553,170, filed Nov. 25, 2014.
Office Action (4 pages) dated Sep. 24, 2015, issued in corresponding Japanese Application No. 2013-247469 and English translation (6 pages).

\* cited by examiner

DRIVER DEVICE

CROSS REFERENCE TO RELATED APPLICATION

The present application is based on and claims the benefit of priority of Japanese Patent Application No. 2013-247469, filed on Nov. 29, 2013, the disclosure of which is incorporated herein by reference.

TECHNICAL FIELD

The present disclosure generally relates to a driver device utilizing a motor.

BACKGROUND INFORMATION

Conventionally, a driver device having a motor and a control unit in one body is known. The control unit includes a rotation angle sensor for detecting a rotation angle of the motor and a semiconductor module having a switching element for switching the power supply to the winding of the stator of the motor. For example, in a patent document 1 (i.e., Japanese Patent Laid-Open No. 2012-152091), a semiconductor module is fixed to a heat sink, and the rotation angle sensor is attached to a substrate that is attached to the heat sink. The heat sink is disposed on an extension of an end part of a rotation shaft of the motor, and is fixed to the housing of the motor.

The heat sink and the substrate are made of respectively different materials. Therefore, the substrate suffers from a heat stress that is caused by the difference between thermal expansion coefficients of two different materials when the temperature environment changes. Here, in the patent document 1, since the shape of the heat sink is distorted due to the temperature change, the heat stress distribution concerning the substrate becomes uneven in a substrate plane. More specifically, there may be a big difference of heat stresses arising on both sides of the rotation angle sensor. Thus, the stress applied on the rotation angle sensor increases due to such a big difference of heat stresses, thereby, causing an increased detection error of the rotation angle sensor.

SUMMARY

It is an object of the present disclosure to provide a driver device that reduces a detection error of a rotation angle sensor.

In an aspect of the present disclosure, the driver device includes a housing, a stator disposed inside the housing, a rotor rotatably disposed inside of and rotating relative to the stator, a rotation shaft attached to and having one body with the rotor. The rotation shaft is rotatably supported by the housing and having one end portion extending outside of the housing. The driver device also includes a heat sink attached to the housing at a position that intersects an extension line of the one end portion of the rotation shaft, a substrate attached to the heat sink at a position between the heat sink and the housing, at least one semiconductor module attached to the heat sink and having a switching element that switches a power supply to a winding wire of the stator, a sensor target disposed on the one end portion of the rotation shaft at a position outside of the housing, and a rotation angle sensor disposed on the substrate for detecting a rotation angle of the sensor target.

The substrate has a center part on which the rotation angle sensor is attached and a periphery portion that is attached to the heat sink. The heat sink includes (i) a cylinder part (i.e., a hollow tubular region) that extends in an axial direction of the rotation shaft and continuously contacts an outer periphery portion of the substrate, (ii) a bottom part positioned on a housing side of the cylinder part, and (iii) a flange part protruding radially outward from the bottom part and fixed to the housing. The cylinder part of the heat sink extends in the axial direction to have equal axial lengths at all portions of the cylinder part to continuously contact the substrate along the outer periphery portion. That is, the cylinder part of the heat sink has a continuous body in one piece, having the same height along the rotation shaft at all portions of the periphery.

Further, in the present disclosure, the driver device also includes a plurality of first fastening members fastening the substrate to the heat sink. The fastening positions of the plurality of first fastening members are axisymmetric to a predetermined virtual straight line that is perpendicular to the axial direction of the rotation shaft.

In addition, in the present disclosure, the rotation angle sensor is positioned on the virtual straight line.

Even further, in the present disclosure, the driver device also includes a plurality of second fastening members fastening the flange part of the heat sink to the housing. The fastening positions of the plurality of second fastening members for fastening the heat sink are positioned along the outer periphery portion of the substrate.

Moreover, in the present disclosure, the substrate has a rectangular shape in cross-section with respect to the axial direction, and the outer periphery portion of the substrate is fixed to the heat sink.

Additionally, in the present disclosure, the outer periphery portion of the substrate has a first side portion facing a second side portion and a third side portion facing a fourth side portion, the first side portion and the second side portion are parallel to the virtual straight line, and the third side portion and the fourth side portion are perpendicular to the virtual straight line. A first semiconductor module and a second semiconductor module are disposed on the substrate. The first semiconductor modules have a first terminal that is connected to the third side portion of the substrate. The second semiconductor modules have a second terminal that is connected to the fourth side portion of the substrate. The first side portion and the second side portion of the substrate are fixed onto the heat sink by the first fastening member. The third side portion and the fourth side portion of the substrate are fixed onto the heat sink by the semiconductor modules.

Still further, in the present disclosure, the driver device also includes a connector for an exchange of electrical signals with external devices. The connector has a terminal that is connected to the first side portion of the substrate, and is screw-fastened onto the heat sink together with the substrate by a first fastening member.

According to the configuration described above, when the heat sink is deformed due to the temperature change, a deformation amount of the cylinder part is evenly distributed along the entire periphery. In other words, a difference of a deformation amount among different positions along the entire periphery is small. Therefore, the heat stress distribution applied to the substrate is evenly distributed along the substrate plane. In other words, the heat stress increases from a center part of the substrate toward the outer periphery portion thereof. Thereby, at the center part of the substrate where the rotation angle sensor is attached, stress change along the substrate plane decreases. In other words, the stress is a minimum at the center of the substrate, where the rotation angle sensor is positioned. Therefore, the magnitude of the stress applied to the rotation angle sensor is reduced to be as small as possible. Therefore, a detection error of the rotation angle sensor is reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
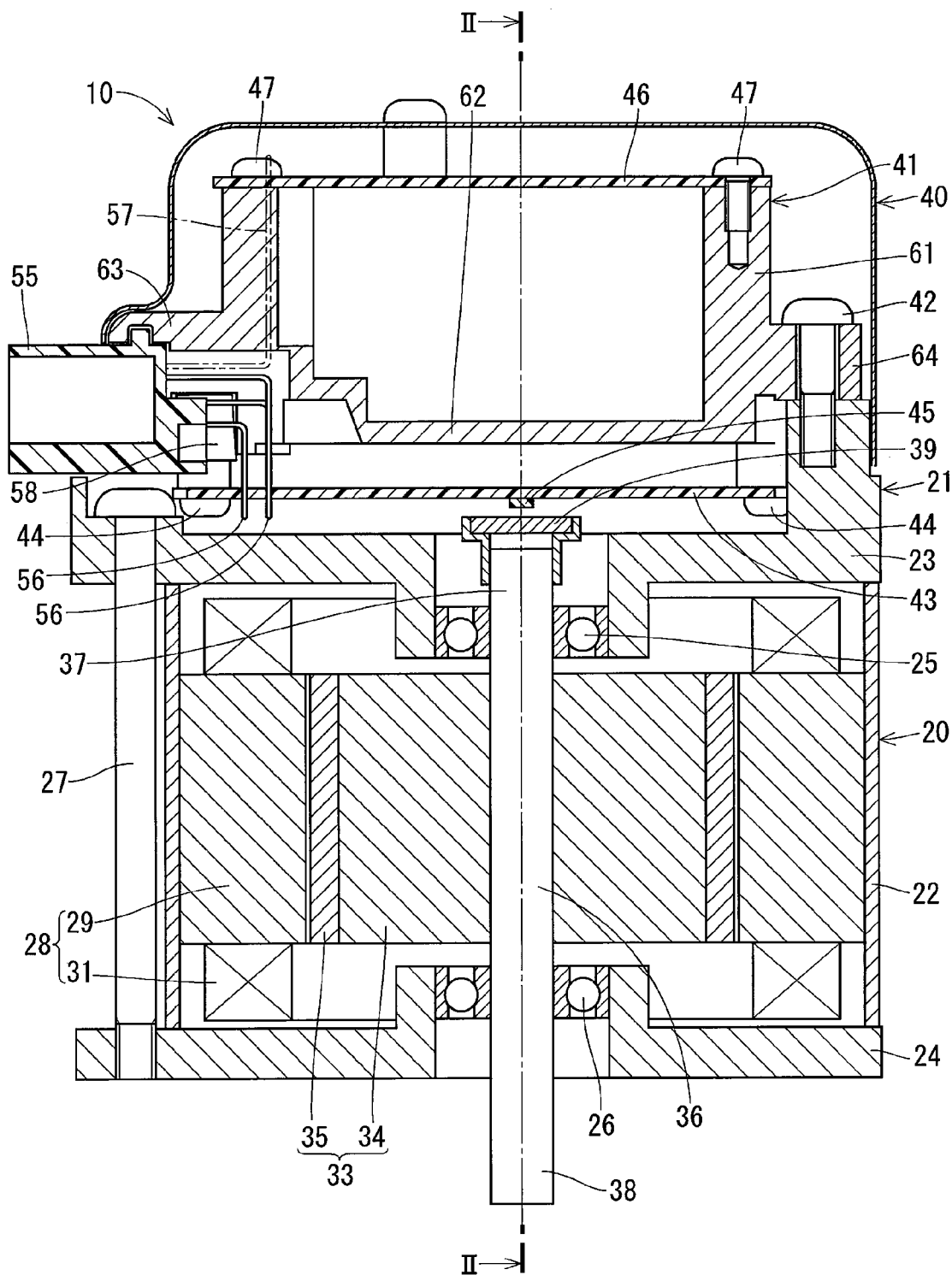
FIG. 1 is a sectional view of a driver device in one embodiment of the present disclosure.

Hereafter, one embodiment of the present disclosure is described based on the drawing.

One Embodiment

The driver device in one embodiment of the present disclosure is used for an electric power steering device of vehicles, for example. As shown in FIG. 1, a driver device 10 is an integral type driver device in which a motor 20 and a control unit 40 controlling the motor 20 are combined to have one body.

Configuration of an Entire Driver Device

Figure 2:
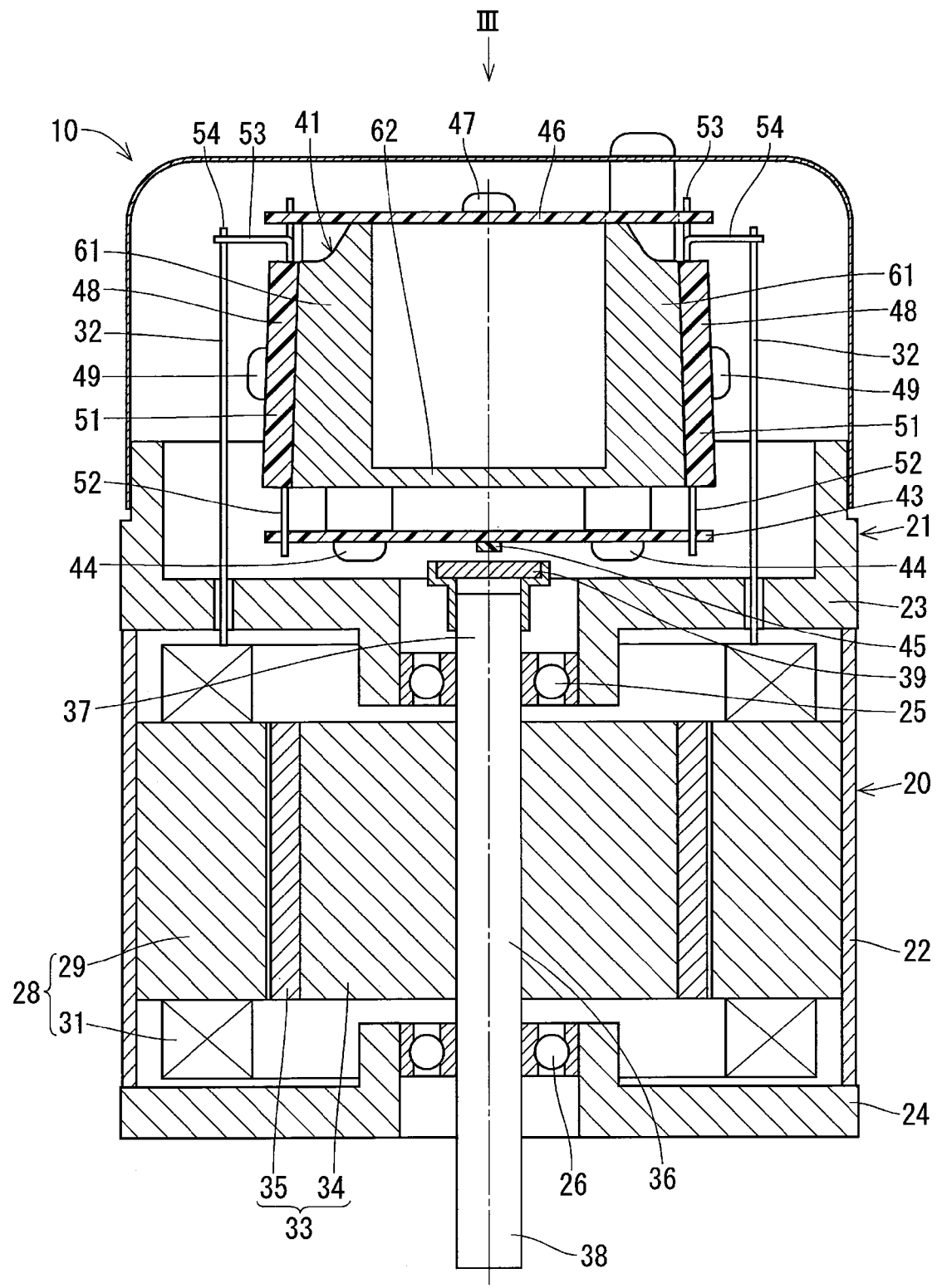
FIG. 2 is a sectional view along a II-II line in FIG. 1.

First, the entire configuration of the driver device 10 is described with reference to FIG. 1 and FIG. 2.

(Motor)

The motor 20 is provided with a housing 21, a stator 28, a rotor 33, and a rotation shaft 36. In the present embodiment, the motor 20 is a three-phase brushless motor.

The housing 21 includes a case 22, a first frame 23, and a second frame 24. The case 22 is a cylinder shape member which consists of a soft magnetic material. The first frame 23 is disposed to cover one end part of the case 22. At the center of the first frame 23, a bearing 25 is disposed. The second frame 24 is disposed to cover an other end of the case 22. At the center of the second frame 24, a bearing 26 is disposed. The first frame 23 and the second frame 24 are holding the case in a binding manner, and multiple through bolts 27 are used to fasten the first and second frames 23, 24.

The stator 28 comprises a stator core 29 fixedly inserted in the case 22 and a winding wire 31 wound around the stator core 29. The winding wire 31 constitutes a three-phase winding circuit which consists of a U phase coil, a V phase coil, and a W phase coil. The winding wire 31 constitutes 2 sets of three-phase winding circuit in the present embodiment. A motor line 32 taken out from each of three phase winding wires extends toward an outside of the housing 21 through the first frame 23.

The rotor 33 is disposed rotatably inside the stator 28, and comprises a rotor core 34 and multiple permanent magnets 35. The rotor core 34 has a cylinder shape, and is coaxially disposed with the stator core 29. Each of the permanent magnets 35 are stuck on a peripheral face of the rotor core 34, i.e., is arranged to have opposite poles in turns along the peripheral face of the rotor core 34.

A rotation shaft 36 is coaxially positioned with the rotor 33 and is disposed to have one body with the rotor core 34. The rotation shaft 36 pierces through the rotor core 34 in an axial direction, and is rotatably supported by the bearings 25 and 26. A one end portion 37 and an other end portion 38 of the rotation shaft 36 extend to protrude out of the housing 21. On the one end portion 37 of the rotation shaft 36, a sensor target 39 which comprises a permanent magnet is fixed. This sensor target 39 is used for a detection of a rotation angle of the rotation shaft 36 by using a rotation angle sensor 45 mentioned below.

(Control Unit)

The control unit 40 is provided with a heat sink 41, a controller substrate 43, the rotation angle sensor 45, a power substrate 46, a semiconductor module 48, a connector 55 and the like.

The heat sink 41 is disposed at a position that intersects an extension line of the one end portion 37 of the rotation shaft 36, which is virtually extended along the rotation shaft 36, and is fixed onto the first frame 23 with a screw 42. The screw 42 is equivalent to a "second fastening member" in the claims. The heat sink 41 is made of a thermally conductive material, such as aluminum.

The controller substrate 43 is made of resin, for example, and is provided at a position between the first frame 23 and the heat sink 41, and is fixed onto the heat sink 41 with a screw 44. The screw 44 is equivalent to a "first fastening member" in the claims. The rotation angle sensor 45 is mounted on the controller substrate 43, as well as other electronic components for a control operation which use a relatively-small electric power, such as a microcomputer (not illustrated).

The rotation angle sensor 45 is disposed to face the sensor target 39 along an axis of the rotor 33, and is attached to the controller substrate 43. The rotation angle sensor 45 detects a rotation angle of the sensor target 39, i.e., the rotation shaft 36 and the rotor 33, by detecting the magnetic flux of the sensor target 39.

The power substrate 46 is disposed on an opposite side of the heat sink 41 relative to the controller substrate 43, and is fixed onto the heat sink 41 with a screw 47. On the power substrate 46, electronic components for a power operation which use a relatively-large electric power, such as a capacitor, a choke coil (not illustrated), etc., are mounted.

The semiconductor module 48 has a switching element which switches the power supply to each of the phase coils of the stator 28 (not illustrated). According to the present embodiment, two semiconductor modules 48 are disposed corresponding to 2 sets of three-phase winding circuit. The semiconductor module 48 is disposed on both sides of the heat sink 41, and is fixed onto the heat sink 41 with a screw 49.

The semiconductor module 48 has, as terminals protruding from a mold part 51 that molds the switching element, a control terminal 52, a power terminal 53, and a motor terminal 54. The control terminal 52 is connected to the controller substrate 43 by soldering. The power terminal 53 is connected to the power substrate 46 by soldering. The motor line 32 is connected to the motor terminal 54 by soldering.

The connector 55 is used for an exchange of electric power and electrical signals with external devices, and has a control connection terminal 56 and a power connection terminal 57. The control connection terminal 56 is connected to the controller substrate 43 by soldering. The power connection terminal 57 is connected to the power substrate 46 by soldering. The connector 55 has a column 58 formed thereon, and is screw-fastened onto the heat sink 41 together with the controller substrate 43 with the screw 44 inserted in the column 58.

In the motor 20 constituted in the above-described manner, the electrical signal indicative of the rotation angle of the rotation shaft 36 which is detected by the rotation angle sensor 45 is outputted to a microcomputer. When the power supply to each of three phase coils of a winding wire of the stator 28 is switched in turns by the microcomputer, a rotating magnetic field is generated, and, when such a rotating magnetic field pulls the rotor 33, the rotation shaft 36 rotates.

[The Feature Configuration]

Next, the "feature" configuration of the driver device 10 is described with reference to FIGS. 1-7.

(Heat Sink)

As shown in FIGS. 1-6, the heat sink 41 has, formed thereon, a cylinder part 61 extending along an axial direction of the rotation shaft 36, a bottom part 62 positioned on one side of the cylinder part 61, i.e., on a first frame 23 side, and two flange parts 63 and 64 protruding outward from the bottom part 62. The cylinder part may have a cross sectional shape with respect to the axial direction that is square, rectangular, or polygonal in shape.

The cylinder part 61 has a rectangular shape in its top view, i.e., when seen from an axial direction of the shaft 36. The semiconductor module 48 is fixed onto a long side of outer walls of the cylinder part 61. The flange parts 63 and 64 are formed to protrude outward from a short side of the outer walls of the cylinder part 61.

The flange part 63 has two through holes 65, and is fastened tightly by the screw 42 inserted in the through hole 65 onto the first frame 23. The flange part 63 has two female screws 66 formed thereon into which the screw 44 is respectively screwed.

The flange part 64 has one through hole 65, and is fastened tightly by the screw 42 inserted in the through hole 65 onto the first frame 23. The flange part 64 also has the two female screws 66 formed thereon into which the screw 44 is respectively screwed.

Figure 3:
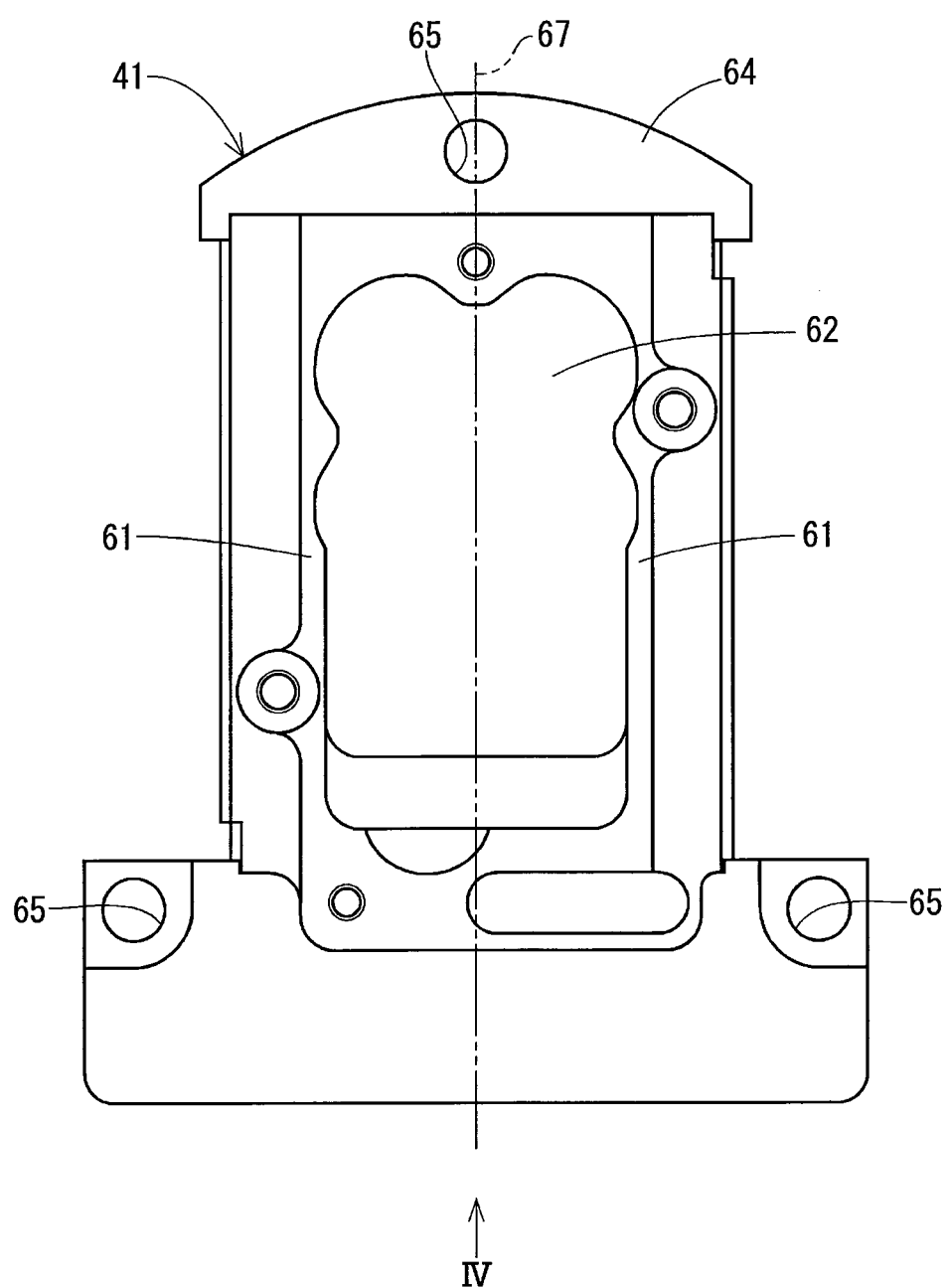
FIG. 3 is a top view of a heat sink along an arrow III in FIG. 2.
Figure 4:
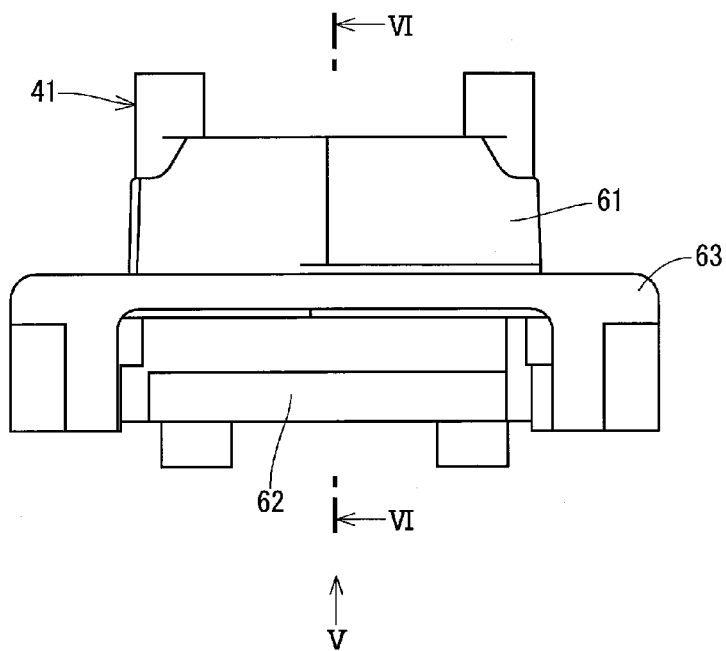
FIG. 4 is a side view of the heat sink along an arrow IV in FIG. 3.
Figure 6:
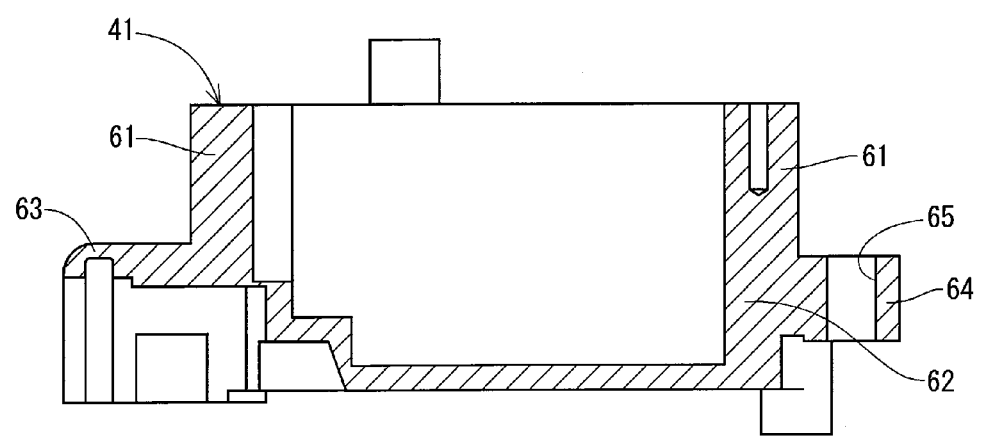
FIG. 6 is a sectional view of along a VI-VI line in FIG. 4.
Figure 5:
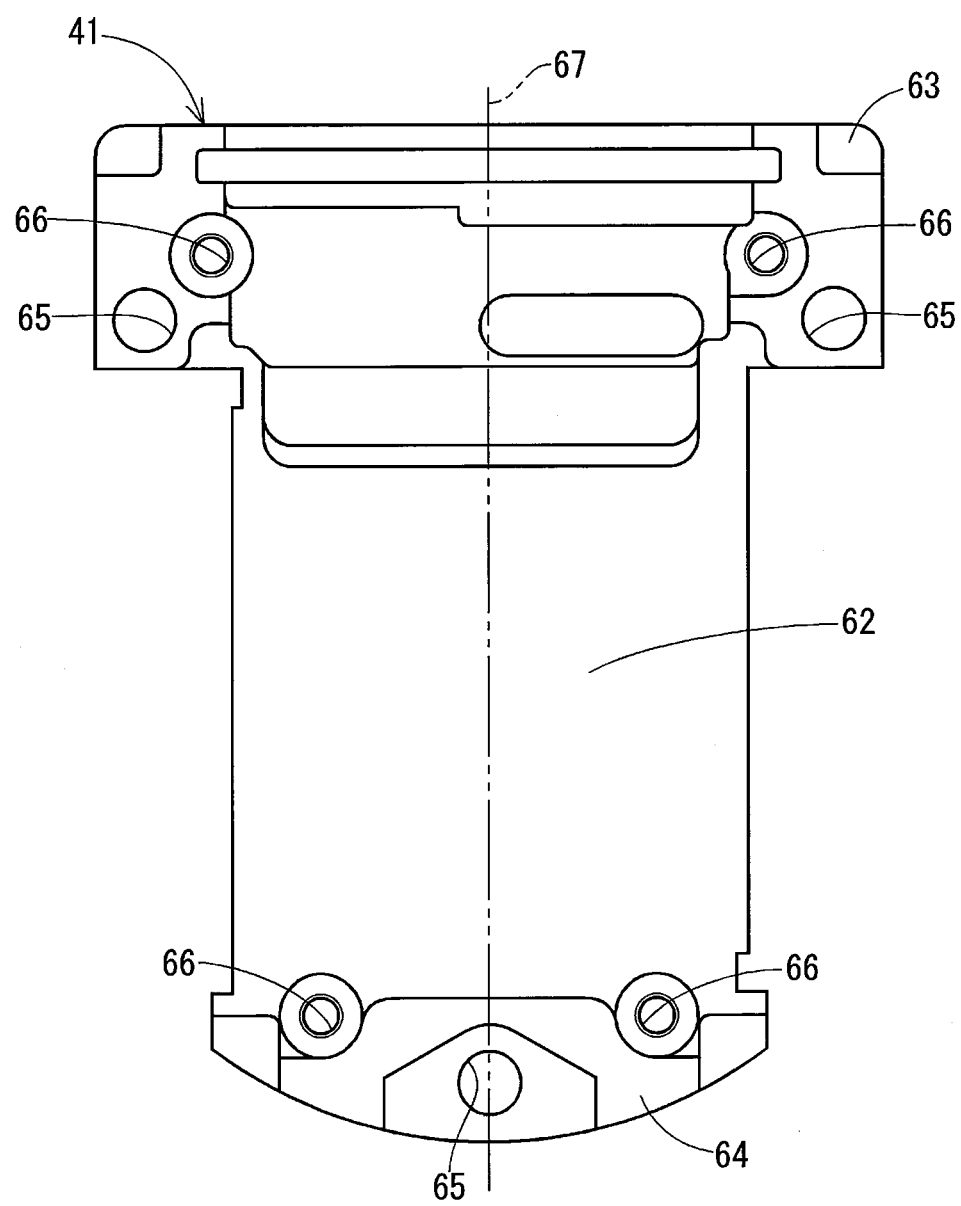
FIG. 5 is a bottom view of the heat sink along an arrow V in FIG. 4.

As shown in FIG. 3 and FIG. 5, an outer shape of the heat sink 41 seen from the axial direction is substantially axisymmetric against a predetermined virtual straight line 67 which intersects perpendicularly with the axial direction.

As shown in FIG. 5, the two through holes 65 and four female screws 66 on the flange part 63 are positioned axisymmetric against the virtual straight line 67. Further, the through hole 65 on the flange part 63 is positioned on the virtual straight line 67.

(Controller Substrate)

Figure 7:
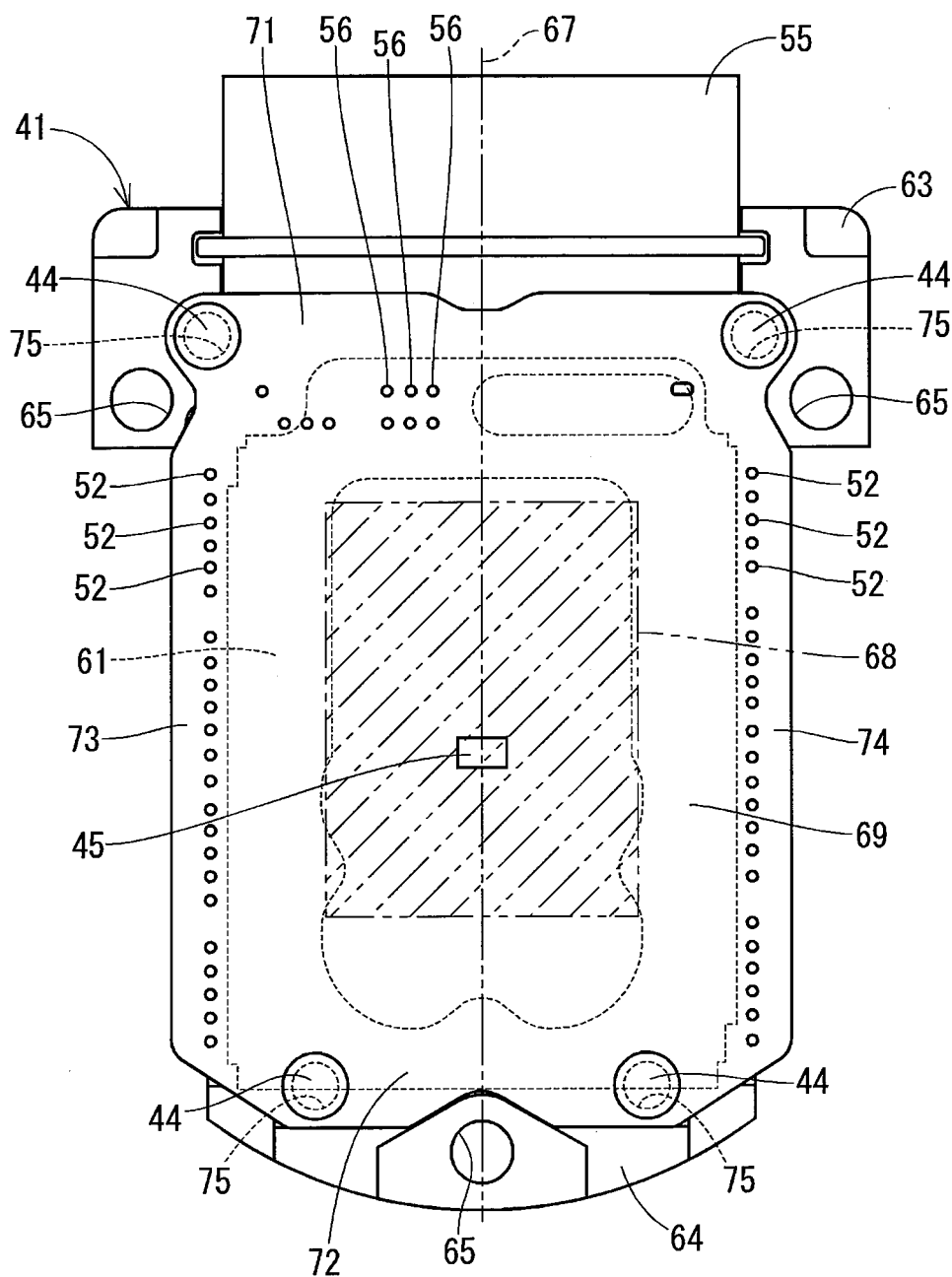
FIG. 7 is a bottom view of a controller substrate and a connector fixed onto the heat sink in FIG. 5.

As shown in FIG. 7, the controller substrate 43 has a rectangular shape when seen from the axial direction, and the rectangular shape is symmetrical against the virtual straight line 67. Further, the controller substrate 43 has a center part 68 to which the rotation angle sensor 45 is attached (i.e., a portion of the substrate 43 shown by hatching of a two-dot chain line in FIG. 7), and an outer periphery portion 69 fixed onto the heat sink 41 (i.e., a portion other than the center part 68). Here, regarding the controller substrate 43, a long side facing width is defined as a width between the two long sides of the rectangular substrate 43, and a short side facing width is defined as a width between the two short sides of the rectangular substrate 43. According to the present embodiment, a dimension of a short side of the center part 68, i.e., "a long side facing width" of the center part 68, is configured to be approximately one half of the long side facing width of the substrate 43, and a dimension of a long side of the center part 68, i.e., "a short side facing width" of the center part 68, is configured to be approximately one half of the short side facing width of the substrate 43.

When the controller substrate 43 is seen from the axial direction, the through holes 65 on the heat sink 41, i.e., the fastening positions of the heat sink 41 with the screw 42, are positioned at outside positions, e.g., along an outer periphery of the controller substrate 43.

As portions of the outer periphery portion 69 of the controller substrate 43, a pair of sides having a parallel facing direction aligned in parallel with the virtual straight line 67 (i.e., two shorter side portions) are respectively designated as a first side portion 71 and a second side portion 72, and a pair of sides having a perpendicular facing direction aligned perpendicular to the virtual straight line 67 are respectively designated as a third side portion 73 and a fourth side portion 74.

The first side portion 71 has two through holes 75 symmetrically positioned against the virtual straight line 67, and is fastened tightly onto the flange part 63 of the heat sink 41 with the two screws 44 inserted in the through holes 75. Further, the first side portion 71 has the control connection terminal 56 of the connector 55 connected thereto.

The second side portion 72 has two through holes 75 symmetrically positioned against the virtual straight line 67, and is fastened tightly onto the flange part 64 of the heat sink 41 with the two screws 44 inserted in the through holes 75. Further, the third side portion 73 and the fourth side portion 74 have the control terminals 52 of the semiconductor modules 48 connected thereto.

Thereby, all sides of the controller substrate 43, i.e., the first to fourth side portions 71, 72, 73, and 74, are fixed onto the heat sink 41 with the screw 44 or with the semiconductor module 48.

(Rotation Angle Sensor)

The rotation angle sensor 45 is disposed at a position in the center part 68 of the controller substrate 43, i.e., a position defined by the virtual straight line 67 (in FIG. 7).

(Cylinder Part of a Heat Sink)

The cylinder part 61 of the heat sink 41 is continuously formed to extend entirely along the outer periphery portion 69 of the controller substrate 43 when seen from the axial direction, and the height of the cylinder part 61 is the same at all portions along the outer periphery portion 69.

Advantageous Effects

As described above, in the present embodiment, the controller substrate 43 has the center part 68 to which the rotation angle sensor 45 is attached and the outer periphery portion 69 fixed onto the heat sink 41.

The heat sink 41 includes, respectively formed thereon, (i) the cylinder part 61 formed to extend along the outer periphery portion 69 of the controller substrate 43 when seen from the axial direction of the rotation shaft 36, (ii) the bottom part 62 positioned on the first frame 23 side of the cylinder part 61, and the flange parts 63 and 64 which project outward from the bottom part 62 and are fixed onto the first frame 23. The cylinder part 61 of the heat sink 41 is formed to have a completely-closed shape, i.e., has a continuous/seamless body, with its height uniformly set to have the same value at all positions.

By devising such a configuration, when the heat sink 41 deforms due to the temperature change, the deformation amount of the cylinder part 61 is even along the entire periphery. That is, the difference of the deformation amount between/among different portions/positions along the periphery is small. Therefore, the heat stress distribution applied to the controller substrate 43 is evenly distributed/dispersed along the plane/surface of the substrate 43. That is, in other words, the heat stress increases from the center part 68 toward the outer periphery portion 69 of the substrate 43. Thereby, at the center part 68 of the substrate 43 where the rotation angle sensor 45 is attached, stress change along the substrate plane becomes small (e.g., smallest). Therefore, the magnitude of the stress applied to the rotation angle sensor 45 is reduced to be as small as possible. Therefore, a detection error of the rotation angle sensor 45 is reduced.

Further, in the present embodiment, the fastening positions of the controller substrate 43 with the screw 44 are positioned axisymmetric to the predetermined virtual straight line 67 which intersects perpendicularly with the axial direction. Therefore, an uneven distribution/dispersion of the heat stress along the substrate plane is further reduced. Therefore, the detection error of the rotation angle sensor 45 is further reduced.

Further, in the present embodiment, the rotation angle sensor 45 is positioned on the virtual straight line 67. Therefore, the position on the line 67, which is a center of symmetry, thereby reducing the unevenness of the heat stress distribution to the minimum on the controller substrate 43, contributes further for the reduction of the detection error of the rotation angle sensor 45.

Further, in the present embodiment, the fastening positions of the heat sink 41 with the screw 42 is located at outside positions of the controller substrate 43, when the controller substrate 43 is seen from the axial direction. Therefore, it is easy to form the controller substrate 43 in a symmetrical shape against the virtual straight line 67.

Further, in the present embodiment, the controller substrate 43 has a rectangular shape when seen from the axial direction, and all of the side portions 71, 72, 73, and 74 are fixed onto the heat sink 41. Therefore, deformation/distortion of the heat sink 41 due to the temperature change is received by/distributed to the entire plane of the controller substrate 43. Therefore, the stress applied to the rotation angle sensor 45 is reduced.

Further, in the present embodiment, the first side portion 71 and the second side portion 72 of the controller substrate 43 are fixed onto the heat sink 41 with the screw 44, and the third side portion 73 and the fourth side portion 74 of the controller substrate 43 are fixed onto the heat sink 41 by the semiconductor module 48. Thus, all of the side portions 71, 72, 73, and 74 of the controller substrate 43 are respectively fixed onto the heat sink 41.

Further, in the present embodiment, the connector 55 used for an exchange of electrical signals with the external devices has the control connection terminal 56 connected to the first side portion 71 of the controller substrate 43, and is screw-fastened tightly onto the heat sink 41 with the screw 44 together with the controller substrate 43. Thereby, the first side portion 71 of the controller substrate 43 is fixed onto the heat sink 41 by the connector 55.

Other Embodiments

The shape of the cylinder part of the heat sink in the axial view (i.e., when seen from the axial direction) in other embodiment of the present disclosure may be other than the rectangular shape, i.e., may be a square shape, an oval shape or the like. In summary, the cylinder part may have any shape, as long as the cylinder part has a continuous and seamless body.

In other embodiments of the present disclosure, the fastening positions of the heat sink may be two positions or four positions or more. Further, the fastening positions of the heat sink may be not completely axisymmetric to the virtual straight line.

In other embodiments of the present disclosure, the fastening positions of the controller substrate may be three positions or less, or five positions or more. Further, the fastening positions of the controller substrate may be not completely be axisymmetric to the virtual straight line.

In other embodiments of the present disclosure, the shape of the controller substrate in the axial view may be other shape, such as a square shape, an oval shape, for example. Further, the shape of the controller substrate in the axial view may be not completely axisymmetric to the virtual straight line.

In other embodiments of the present disclosure, the rotation angle sensor may be disposed at a position away from the virtual straight line. In summary, the rotation angle sensor may be disposed at a position in the proximity of the center part of the controller substrate.

In other embodiments of the present disclosure, the driver device may be used in other devices other than the electric power steering device.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A driver device comprising:
   a housing;
   a stator disposed inside the housing;
   a rotor rotatably disposed inside of and rotating relative to the stator;
   a rotation shaft attached to and having one body with the rotor, the rotation shaft rotatably supported by the housing and having one end portion extending outside of the housing;
   a heat sink attached to the housing at a position that intersects an extension line of the one end portion of the rotation shaft;
   a substrate attached to the heat sink at a position between the heat sink and the housing;
   at least one semiconductor module attached to the heat sink;
   a sensor target disposed on the one end portion of the rotation shaft at a position outside of the housing; and
   a rotation angle sensor disposed on the substrate for detecting a rotation angle of the sensor target, wherein
   the substrate has a center part on which the rotation angle sensor is attached and a periphery portion that is attached to the heat sink,
   the heat sink includes (i) a cylinder part that is continuously formed to extend along an outer periphery portion of the substrate, when seen from an axial direction of the rotation shaft to overlap along an outer periphery portion of the substrate, (ii) a bottom part positioned on a housing side of the cylinder part, and (iii) a flange part protruding radially outward from the bottom part and fixed to the housing, and the height of the cylinder part of the heat sink being the same at all portions of the extension along the outer periphery portion.

2. The driver device of claim 1, further comprising:
a plurality of first fastening members fastening the substrate to the heat sink, wherein
fastening positions of the plurality of first fastening members are axisymmetric to a predetermined virtual straight line that is perpendicular to the axial direction of the rotation shaft.

3. The driver device of claim 2, wherein
the rotation angle sensor is positioned on the virtual straight line.

4. The driver device of claim 3, further comprising:
a plurality of second fastening members fastening the flange part of the heat sink to the housing, wherein
fastening positions of the plurality of second fastening members for fastening the heat sink are positioned along the outer periphery portion of the substrate.

5. The driver device of claim 4, wherein
the substrate has a rectangular shape in cross-section with respect to the axial direction, and
the outer periphery portion of the substrate is fixed to the heat sink.

6. The driver device of claim 5, wherein
the outer periphery portion of the substrate has a first side portion facing a second side portion and a third side portion facing a fourth side portion, the first side portion and the second side portion are parallel to the virtual straight line, and the third side portion and the fourth side portion are perpendicular to the virtual straight line, a first semiconductor module and a second semiconductor module are disposed on the substrate, the first semiconductor modules have a first terminal that is connected to the third side portion of the substrate, the second semiconductor modules have a second terminal that is connected to the fourth side portion of the substrate, the first side portion and the second side portion of the substrate are fixed onto the heat sink by the first fastening member, and the third side portion and the fourth side portion of the substrate are fixed onto the heat sink by the semiconductor modules.

7. The driver device of claim 6, further comprising:
a connector for an exchange of electrical signals with external devices, wherein
the connector has a terminal that is connected to the first side portion of the substrate, and is screw-fastened onto the heat sink together with the substrate by a first fastening member.

8. The driver device of claim 1, wherein the cylinder part is continuously formed to extend entirely along an entire outer periphery portion of the substrate, when seen in the axial direction of the rotation shaft.

* * * * *